United States Patent
Kartasuk et al.

[15] 3,669,440
[45] June 13, 1972

[54] QUICK ENGAGING AND DISENGAGING NUT MECHANISM

[72] Inventors: Ray Kartasuk, Lincolnwood; Ray Gloridso, Oak Park, both of Ill.

[73] Assignee: Wilton Corporation, Cook County, Ill.

[22] Filed: June 18, 1970

[21] Appl. No.: 47,302

Related U.S. Application Data

[63] Continuation-in-part of Ser. No. 860,661, Sept. 24, 1969, abandoned.

[52] U.S. Cl. ......................................... 269/181, 74/424.8 A
[51] Int. Cl. ......................................... B25b 1/12, F16h 1/16
[58] Field of Search ............... 74/424.8 R, 424.8 A; 269/181, 269/182, 183

[56] References Cited

UNITED STATES PATENTS 1,055,278  3/1913  Hunt ......................................... 269/181
3,492,886  2/1970  Naureckas ............................. 269/182

*Primary Examiner*—Theron E. Condon
*Assistant Examiner*—Neil Abrams
*Attorney*—Olson, Trexler, Wolters & Bushnell

[57] ABSTRACT

A screw-threaded device as for use in a vise or other clamping mechanism which includes a threaded shaft received in a partially threaded nut. The threaded shaft is axially movable under an axial actuating force at a rapid rate, and is incrementally advanced axially by a rotative force thereon, the screw threads of the shaft being automatically moved into or out of engagement with the partial threads of the nut upon rotation of the shaft in advancing or retracting direction. One spring coacts between the nut and a guide yoke on the shaft to guide the nut in and out of engagement with the shaft, while a second spring on the yoke bears against the shaft and tends to turn the yoke with the shaft. A second form of the invention uses the same, or essentially the same, partially threaded nut and guide yoke, but uses a positive pivot pin for guiding the partially threaded nut in and out of engagement with the threaded shaft.

19 Claims, 10 Drawing Figures

Inventors
Ray Kartasuk
Ray Glorioso
By: Olson, Trexler, Wolters & Bushnell Attys Inventors
Ray Kartasuk
Ray Glorioso
By: Olson, Trexler, Wolters & Bushnell attys

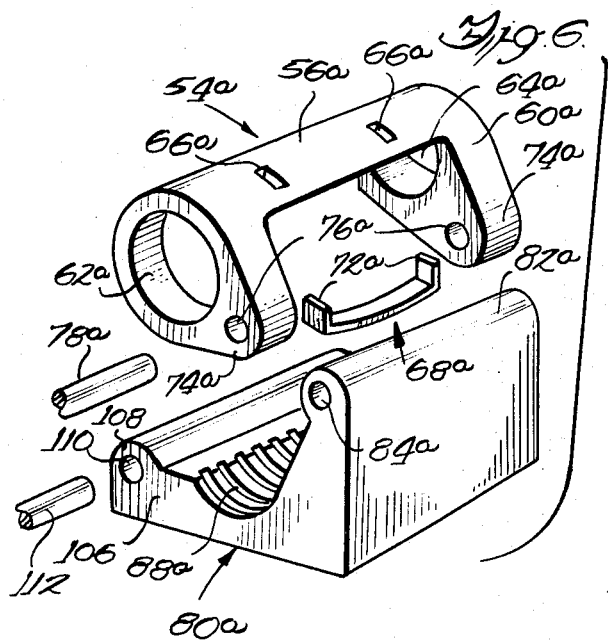
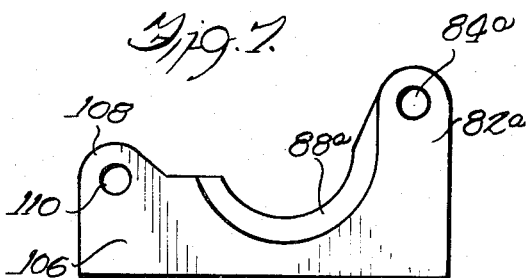
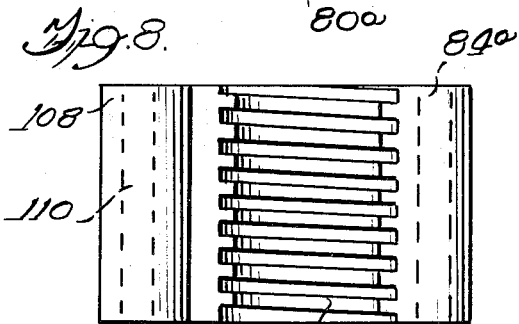
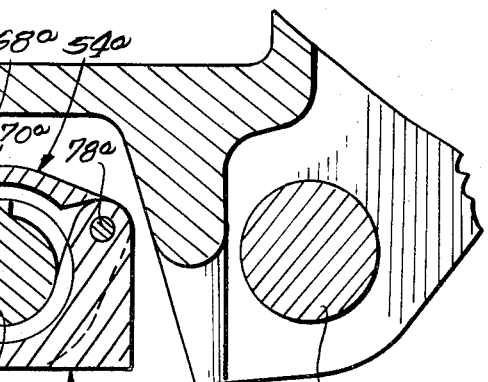
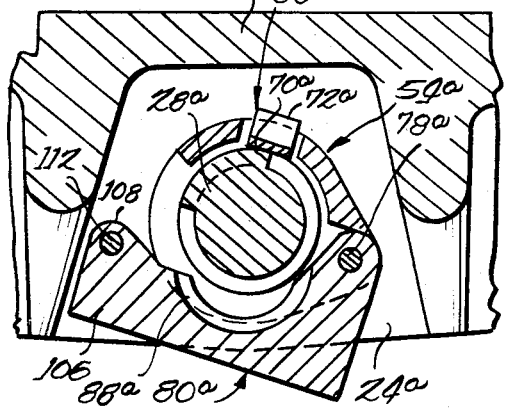

QUICK ENGAGING AND DISENGAGING NUT MECHANISM

This application is a continuation-in-part of our copending application, Ser. No. 860,661, filed Sept. 24, 1969, now abandoned.

In the use of various types of clamping devices or apparatus, such as vises, C-clamps, work-holding clamps, etc., it is often necessary or desirable to allow one clamping member or jaw to retract rapidly from the vicinity of the workpiece, and, conversely, to provide for rapid advancement into engagement with a workpiece, and thereafter to move slowly to advance with considerable clamping force to grip the workpiece in position. Devices of this type are known in the prior art, and one such is that disclosed and claimed in Farrell U.S. Pat. No. 2,430,458. In this patent the partially threaded nut is of elliptical shape and cooperates with a curved wall of a base or mounting structure whereby the nut is cammed in and out of screw-threaded relation with the screw-threaded shaft, depending on the direction of rotation of the shaft. Although this device works satisfactorily, it is expensive to manufacture. The elliptical nut must be cast, and as will be realized, it is very difficult to hold close tolerances in casting techniques. The base or supporting frame also must be held to rather close tolerances, and by its very shape and nature this base must also be cast. Thus, there are two cooperating cast pieces which must be held to very close tolerances. This is expensive to achieve in manufacture, and is accompanied by either a high percentage of rejects, or an expensive hand finishing operation.

The advantages of the device of the type just outlined were retained and certain of the disadvantages were avoided in Naureckas application for U.S. Pat. Ser. No. 677,950, filed Oct. 5, 1967 and entitled "QUICK ACTING SCREW-THREADED DEVICE", now U.S. Pat. No. 3,492,886. In a device therein disclosed and claimed hexagonal bar stock is used for the nut, thereby avoiding requirements for a casting for the nut. In addition, the reaction members engageable with the nut comprise a pair of set screws, thus avoiding the necessity of close tolerances in the cast base.

In the prior art with which we are familiar, including the devices as outlined above, it has always been necessary to provide some sort of a reaction surface or member on the fixed base of the vise or the like. Thus, some degree of precision must be maintained between two relatively disconnected parts. Furthermore, the engagement between the nut member and the shaft has been progressive or gradual. It has been found in the field that workmen are prone to try pushing or pulling the shaft axially before it has completely released from or completely engaged with the nut. This tends to round off the corners of the screw threads, both on the shaft and on the nut, thereby shortening the service life of the device.

In the present invention the nut (or more accurately, half nut) is supported by a yoke about the shaft. A spring member carried by the yoke bears against the shaft, and tends to turn the yoke in the same direction of rotation as the shaft. A leaf spring acts between the yoke and the nut to guide the nut in and out of engagement with the shaft, and under certain circumstances of operation to insure a snap action between the nut and the shaft, quickly moving the nut into or out of engagement with the shaft and saving considerably in wear on the threads of the shaft and of the nut. In a second form of the invention the leaf spring is omitted, but the yoke remains without change, and the nut is quite similar. Rather than the leaf spring, a fixed pivot pin is used to guide the nut in and out of engagement with the threaded shaft.

Therefore, it is an object of the present invention to provide a quick engaging and disengaging nut mechanism including a partially threaded nut movable into and out of engagement with a threaded shaft by means of a guide yoke riding on the shaft.

It is another object of the present invention to provide a quick engaging and disengaging nut mechanism which tends to snap in and out of engagement.

A further object of the present invention is to provide a quick acting screw-threaded device requiring no camming or wedging engagement with the base or frame of the device to effect engagement and disengagement of a nut member with a threaded shaft.

Other and further objects and advantages of the present invention will be apparent from the following description when taken in connection with the accompanying drawings wherein:

FIG. 6 is a perspective view similar to FIG. 5 showing a modification of the invention;

FIG. 7 is an end view of the partially threaded nut corresponding to FIG. 6;

FIG. 8 is a top view of the nut of FIG. 7;

FIG. 9 is a cross-sectional view similar to FIG. 3, but corresponding to the modification of FIG. 6; and, FIG. 10 is a fragmentary view corresponding to FIG. 9 and generally similar to FIG. 4.

Figure 1:
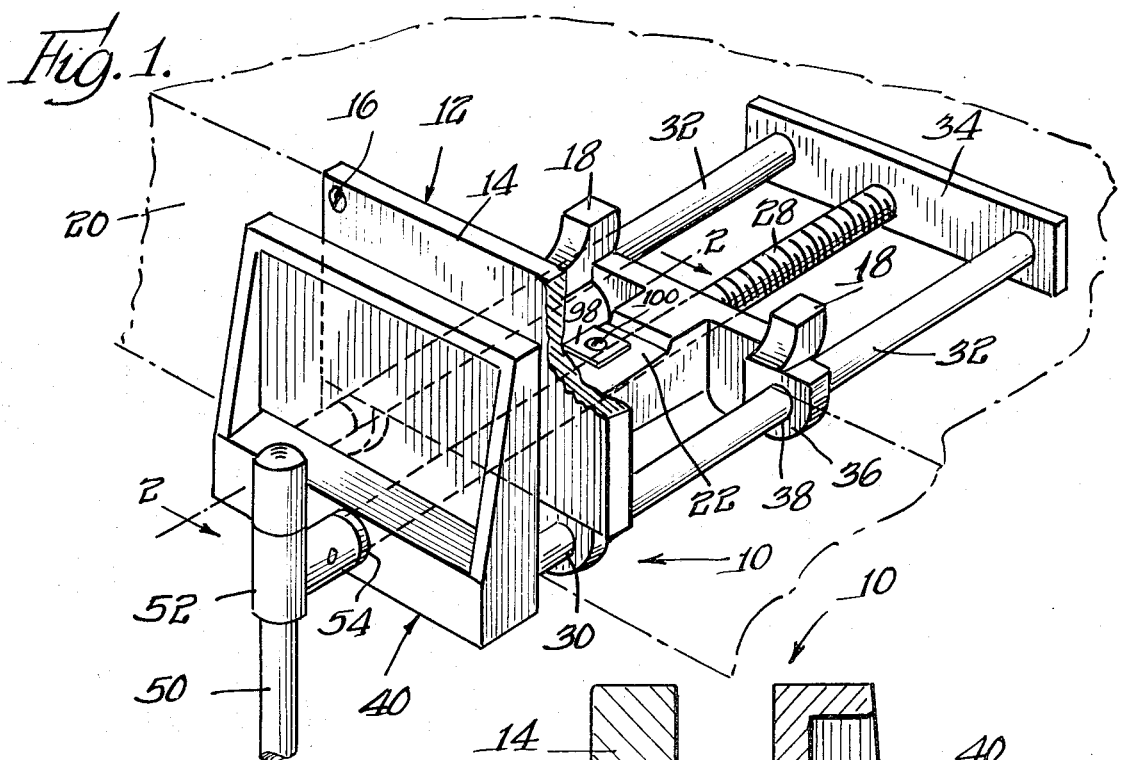
FIG. 1 is a perspective view of a vise constructed in accordance with the present invention.
Figure 2:
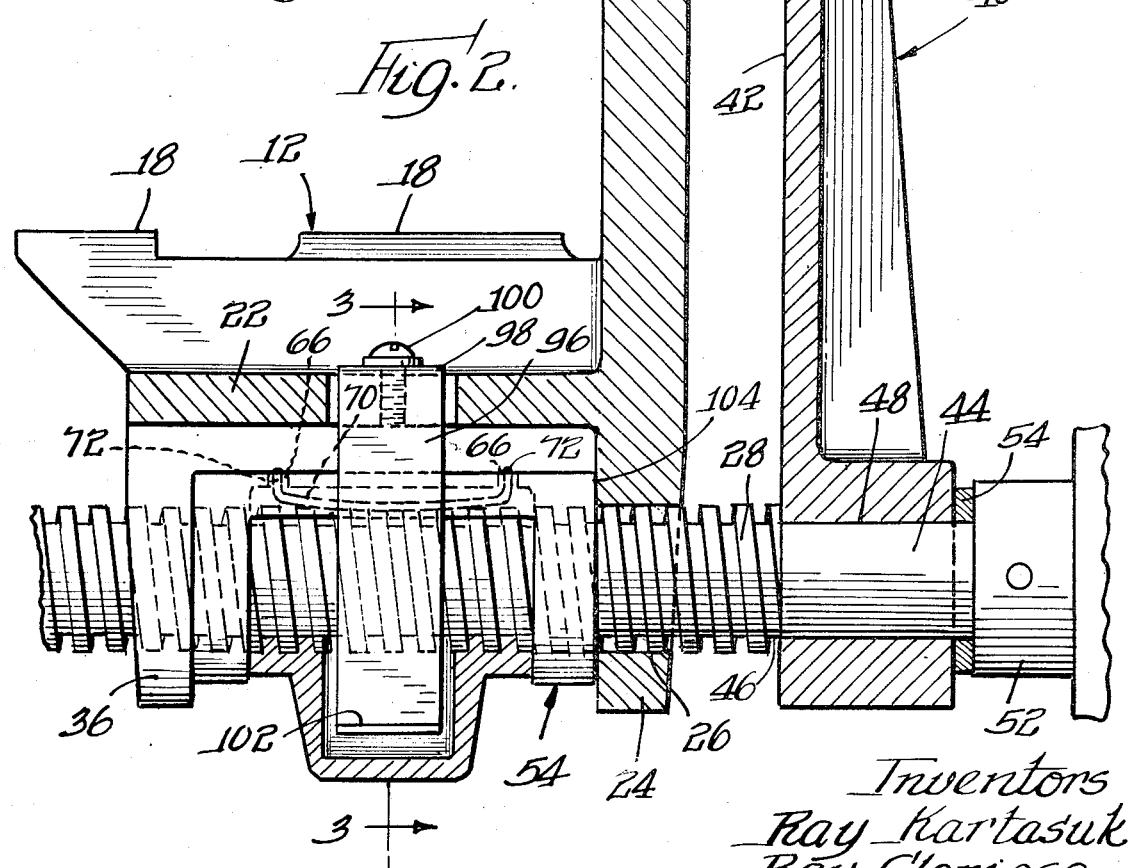
FIG. 2 is a longitudinal sectional view taken substantially along the line 2—2 in FIG. 1.

Turning first to FIGS. 1 and 2 of the drawings, there will be seen a vise identified generally by the numeral 10 and including a fixed base 12 having an upright front face or jaw 14 apertured at its upper corners as indicated at 16 for securing to the front of a worktable or the like as by screws. The fixed base further includes horizontal spaced upper surfaces 18 to engage the underside of the worktable, the worktable being indicated in phantom at 20 in FIG. 1. The fixed base may also be secured to the underside of the worktable, but that is not of particular moment in connection with the present invention.

The fixed base 12 further includes a central web 22 of which more will be said hereinafter.

A flange 24 depends below jaw 14 and is provided with a smooth bore 26 through which threaded or rotation shaft 28 extends. The aperture or hole 26 is smooth bored and merely journals the threaded rotation shaft 28. Spaced outwardly and symmetrically on opposite sides of the aperture 26 the flange 24 is provided with two additional apertures 30 through which smooth stabilizing rods or bars 32 extend, the rear end of the stabilizing bars 32 being connected by a cross member 34 (FIG. 1) which cross member rotatably receives the extremity of the shaft 28. Although not specifically shown, the extremity of the shaft 28 preferably is of reduced diameter and is provided on the far side of the cross member 34 with a cotter pin or other common retainer to hold the cross member on the end of the threaded shaft. As also may be seen in FIG. 1, the rear portion of the main base 12 is provided with depending flanges 36 having apertures 38 therein through which stabilizing rods 32 extend.

A front or movable jaw 40 having a face 42 confronting the fixed jaw or face 14 is supported on the forward ends of the stabilizing bars 32, the latter being secured in apertures in the front jaw by conventional retaining means such as pins. The front portion of the threaded rod 28 is smooth as indicated at 44 (FIG. 2), being shouldered at 46 where it joins the threaded portion of the rod, the smooth portion being journaled in a bore 48 through the lower central portion of the front or movable jaw 40. A handle 50 is secured at the front end of the threaded rod 28 by a T-shaped fitting 52 spaced from the front jaw by a washer 53. Thus, the threaded rod 28 is rotatable by means of the handle relative to the front jaw, and upon axial movement of the threaded shaft the front jaw is moved with the shaft.

Figure 3:
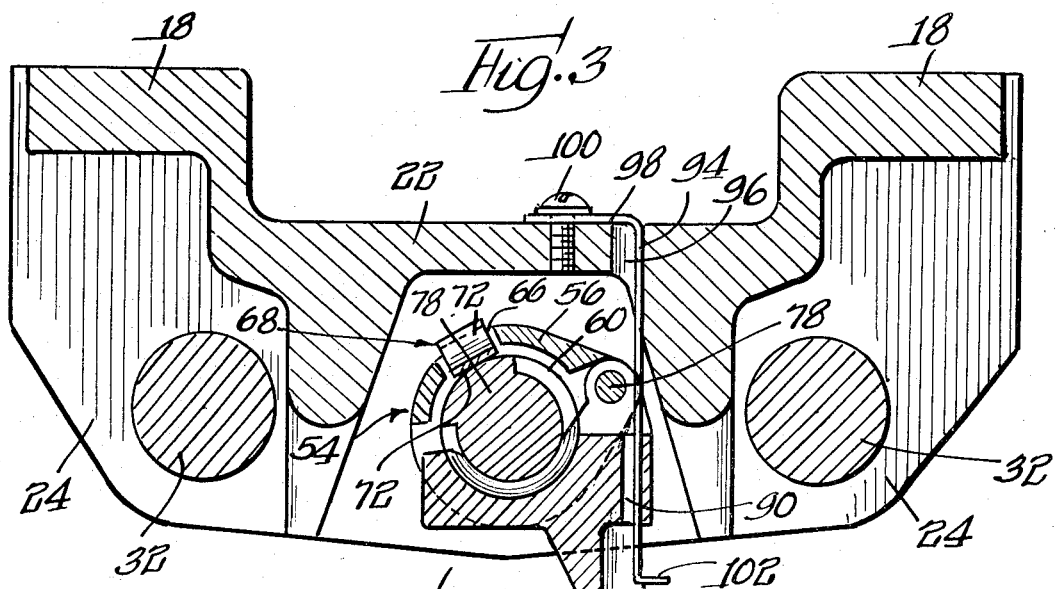
FIG. 3 is a transverse sectional view taken substantially along the line 3—3 in FIG. 2 with the parts in screw-threaded engagement.
Figure 4:
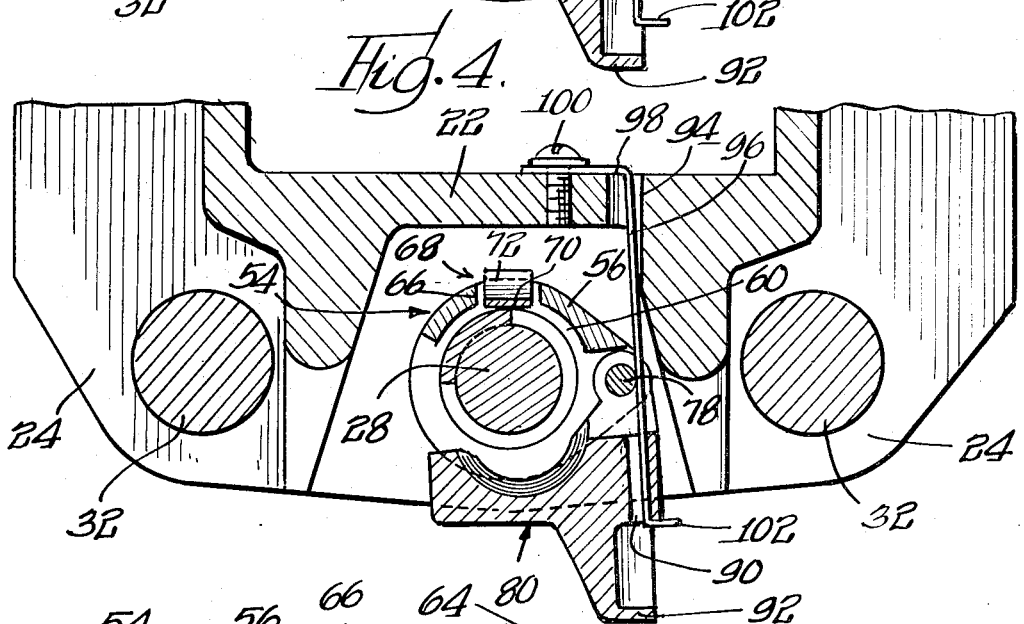
FIG. 4 is a view similar to FIG. 3 showing the parts out of screw-threaded engagement.
Figure 5:
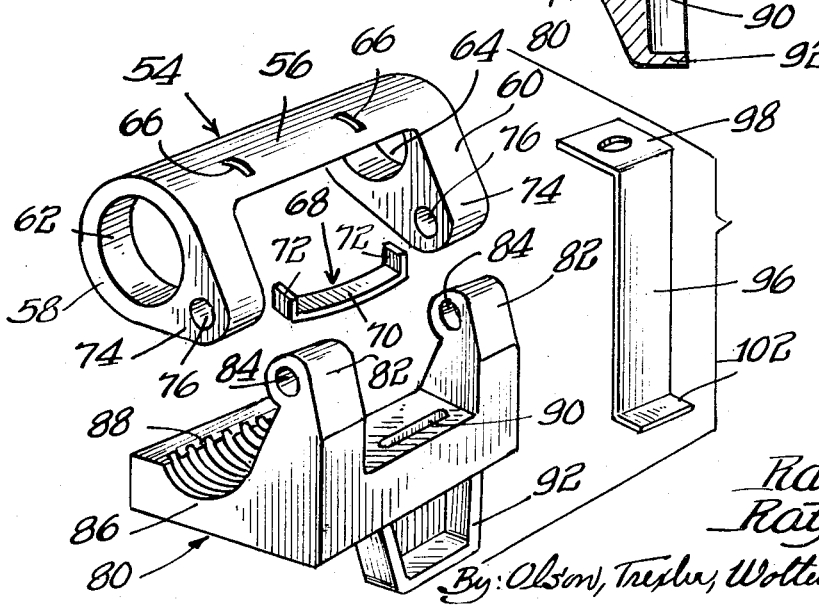
FIG. 5 is an exploded perspective view of the nut and yoke and the associated springs.

Turning now to FIGS. 3–5 as well as FIGS. 1–2, a nut rotator or yoke 54 rides on the threaded shaft 28 below the web 22 and immediately to the rear of the depending flange 24. The nut rotator comprises a substantially semi-cylindrical body section 56 and a pair of generally ringlike end sections 58 and 60 provided with aligned axial bores 62 and 64 receiving the threaded shaft 28. The body 56 is provided with a pair of longitudinally spaced and aligned transverse slots 66 which receive the ends of a rotator spring 68. As will be seen particularly in FIG. 5, this spring has an elongated, slightly concave upward midsection or bight 70 and upwardly directed spaced ends 72. The spaced ends 72 are received in the slots 66 and the bight 70 resiliently bears against the shaft 28, thereby attending to rotate the nut rotator with the shaft.

The ringlike end sections 58 of the yoke or nut rotator are provided with generally triangular extensions 74 having aligned holes 76 therein receiving a pivot pin 78. A nut 80 is pivotally supported on the pivot pin 78, having arms 82 apertured at 84 lying between and immediately adjacent to the extensions 74 of the nut rotator. The nut comprises a main body 86 slightly shorter in length than the nut rotator and equivalent to several turns of the thread on the shaft. The nut is provided with a generally semicylindrical inner surface 88 having threads thereon complimentary to the threads on the shaft 28. As will be seen in the drawings, the threads have a nearly square profile, and are commonly known as a modified Acme thread. The nut 80 is provided along the right-hand side (as viewed in FIGS. 3–5) with a substantially vertical slot 90 elongated relative to a longitudinal direction of the threaded shaft. A guard 92 underlies the slot 90, and as may be seen in FIGS. 2–5, the nut rotator generally lies on top of the threaded shaft 28, while the nut 80 lies below the shaft.

A slot 94 is provided in the web 22 above the slot 90 and generally in vertical alignment therewith. A flat blade spring 96 extends through the slots 94 and 90, having a relatively large right angle mounting flange 98 at the upper end receiving a mounting screw 100 which is threaded into the web. An oppositely extending rather narrow flange 102 is provided at the lower end of the spring 96 immediately below the lower termination of the slot 90.

All of the parts of the device have now been described, and the operation remains to be considered. As shown in FIGS. 2 and 3, the nut 80 is in engagement with the threads of the shaft 28. Bearing in mind that the threads are right-hand threads, and that the view of FIG. 3 is looking forward, counterclockwise rotation of the shaft in FIG. 3 would slowly advance the shaft through the nut to pull the front jaw 40 towards the fixed jaw 14.

On the other hand, clockwise rotation of the threaded shaft as viewed in FIGS. 3 and 4 will cause the nut rotator 54 to turn clockwise from the position shown in FIG. 3 to the position shown in FIG. 4 due to the frictional engagement of the spring 68 with the shaft. The pin 78 thus is somewhat lowered in position, and the nut 80 tends to drop somewhat. The spring 94 serves as a guide coacting with the slot 90, and the nut therefore moves down out of engagement with the shaft 28. The shaft 28 is now free for rapid axial movement either forwardly or rearwardly by means of handle 50 and fitting 52, whereby to carry the front jaw 40 rapidly, forwardly or rearwardly.

Subsequent rotation of the shaft in a counterclockwise direction moves the parts from the position of FIG. 4 back to the position of FIG. 3. The pin 78 rises as the nut rotator turns in a counterclockwise direction due to the frictional engagement of the spring 68 with the shaft, and the nut rides up the spring 96 as a guide, bringing the threaded section 88 of the nut back into threaded engagement with the shaft for slow or incremental advance of the front jaw into clamping relation with a workpiece positioned between it and the fixed jaw.

Insofar as the operation has now been described, it is not essential that the spring 96 be possessed of spring characteristics. It would operate satisfactorily if it were rigid. However, after the threaded shaft and front jaw have been moved rapidly axially in one direction or the other, it is only an accident if the threads of the nut and of the shaft immediately fit into proper engagement. Upon starting of the counter-clockwise rotation of the shaft the crests of the two sets of threads may very well ride against one another, in which case the spring deflects to the right. However, as soon as the threads come into proper alignment with one another, the nut is snapped into threaded engagement with the shaft under the resilient influence of the spring 94. Thus, the spring serves not only as a guide, but also as a device for bringing the threads into snap or quick engagement. Conversely, the spring is slightly loaded and causes the threads to snap out of engagement. In addition, it will be understood that the spring serves to lock the nut and rotator to the main base 12 of the device to prevent axial shifting of the nut and rotator with the shaft when the shaft is moved axially toward a closing position. However, as will be understood, when the jaws close on a workpiece, there is a tension force developed in the threaded shaft, and this is resisted by engagement of the nut rotator with the rear surface of the depending flange 24, as indicated at 104 in FIG. 2.

A modified form of the invention is shown in FIGS. 6–10. Most of the parts are the same as or similar to those heretofore shown and described, and to avoid prolixity of disclosure, like numerals are utilized with the addition of the suffix a to identify similar parts. Thus, the yoke 54 remains essentially as described heretofore. The nut 80a is pivoted thereto on a pin 78a, as heretofore, and is quite similar to that heretofore shown and described. Rather than having the two upstanding arms 82 as in the previous form of the invention, the partially threaded nut has a single upstanding flange 82a. This is easier to form than the separate arms, and the base for the spring is not needed, since the spring is not used in the present form of the invention.

The essential distinction in the present form of the invention is that the nut is extended in a relatively flat flange portion 106 on the side opposite the upstanding arm or flange 82a, and has a raised portion 108 on the upper extremity thereof, a bore 110 extending through the flange 106 and raised portion 108 thereof. A pin 112 extends parallel to the shaft 28a and has its opposite ends fixed in the depending flange 24a and the flange (not shown) corresponding to the flange 36 in FIG. 2. The pin 112 extends through the bore 108, thereby pivotally supporting the nut 80a.

When the shaft 28a is turned in an advancing or tightening direction (counterclockwise in FIG. 9) the yoke 54a, by virtue of the spring 68a pressing on the shaft 28a, tries to follow rotation of the shaft, thereby raising the pivot pin 78a, and pivoting the nut 80a up about the pin 112 to raise the threads 88a of the nut into engagement with the threads in the shaft, as shown in FIG. 9. Conversely, when the shaft is turned in the opposite direction, clockwise in FIG. 10, the yoke 54a turns with the shaft, thereby lowering the pin 78a, and pivoting the nut 80a down about the pin 112, thus moving the partial threads 88a of the nut out of engagement with the threads on the shaft 28a, whereby the nut is free of the shaft, and the shaft can be shifted axially back and forth rapidly, as heretofore described.

As will be apparent the pin 112 is generically related to the guide spring 96 in that both are nut positioning members. In the form of the invention just described, the nut member pivoted about this nut positioning member, while in the earlier form of the invention the nut is guided along the nut positioning member.

The specific forms of the invention as herein shown and described are for illustrative purposes only. Various changes will be apparent to those skilled in the art, and will be understood as forming a part of the present invention insofar as they fall within the spirit and scope of the appended claims.

The invention is claimed as follows:

1. A quick acting screw-threaded device comprising base means, a screw-threaded shaft supported by said base means for rotation and axial movement, a nut member, said nut member having a surface with partial threads therein selectively engageable with and separable from said threaded shaft, a nut rotating member operatively connected with said nut member and frictionally tending to turn with said shaft, a nut positioning guide member engaging said base means and said nut member having an aperture that receives said guide member, rotation of said shaft in one direction frictionally turning said nut rotating member in one direction, said nut positioning guide member applying force to said nut member to snap said nut member into threaded engagement with said shaft, and rotation of said shaft in the opposite direction turning said nut member in the opposite direction, said nut rotating member and said nut positioning guide member cooperating to snap said nut member out of threaded engagement with said shaft, said shaft thereupon being free for rapid axial advance.

2. A device as set forth in claim 1, wherein the guide member comprises a spring.

3. A device as set forth in claim 2, wherein the spring comprises a leaf spring.

4. A device as set forth in claim 1, wherein said aperture comprises a slot.

5. A device as set forth in claim 2, wherein said spring comprises a leaf spring and wherein the aperture comprises a slot.

6. A device as set forth in claim 1 and further including means pivotally interconnecting said nut member and said nut rotating member.

7. A device as set forth in claim 1, wherein said nut rotating member comprises a yoke having a plurality of rings encircling said shaft.

8. A device as set forth in claim 7, wherein said yoke includes a body interconnecting said rings, and a spring member carried by said body and frictionally bearing against said shaft.

9. A device as set forth in claim 7 and further including means pivotally mounting said nut member on said nut rotating member.

10. A device as set forth in claim 1, wherein said guide member comprises a leaf spring, the aperture comprises a slot in said nut member, and wherein said nut rotating member comprises a yoke including a plurality of rings encircling said shaft at an inner connecting body portion, and means pivotally connecting said nut member to said nut rotating member.

11. A device as set forth in claim 1, wherein said base comprises a clamp member.

12. A device as set forth in claim 11 and further including an opposing clamp member connected to said shaft for axial movement therewith.

13. A device as set forth in claim 12 comprising a vise, and including means on said base clamp member for mounting said device on a supporting table or the like.

14. A quick acting screw-threaded device comprising base means, a screw-threaded shaft supported by said base means for rotation and axial movement, a nut member, said nut member having a surface with partial threads therein selectively engageable with and separable from said threaded shaft, a nut rotating member pivotally connected with said nut member and frictionally tending to turn with said shaft, a nut positioning guide member engaging said nut member, said guide member being an extension of said nut member and being pivotally connected to said base means, rotation of said shaft in one direction frictionally turning said nut rotating member in one direction, said nut rotating member and said nut positioning guide member cooperating to move said nut positioning member into threaded engagement with said shaft, and rotation of said shaft in the opposite direction turning said nut member in the opposite direction, said nut rotating member and said nut positioning guide member thereupon cooperating to move said nut member out of threaded engagement with said shaft, said shaft thereupon being free for rapid axial advance.

15. A device as set forth in claim 14 wherein the nut positioning guide member comprises an integral flange on said nut member.

16. A device as set forth in claim 14 wherein the nut rotating member comprises a member encircling said shaft and having means thereon engageable frictionally with said shaft.

17. A device as set forth in claim 16 wherein the nut rotating member comprises a yoke having a body portion encircling said shaft and arm means extending radially therefrom and pivotally connected with said nut member.

18. A device according to claim 17 comprising a vise and wherein the base means comprises a clamp member, said device further including an opposed clamp member connected to said shaft for axial movement therewith.

19. A quick acting vise comprising base means, a screw-threaded shaft supported by said base means for rotation and axial movement, a vise jaw carried by said shaft, a nut member having a surface with threads therein selectively engageable with and separable from said threaded shaft, a nut rotating member including a yoke having spaced rings encircling said shaft, said yoke having spaced slots intermediate said rings, a U-shaped rotator spring interposed between said shaft and said yoke and having ends projecting through said slots, said spring having a bight against said shaft and providing driving engagement between said shaft and said nut rotating member, and means cooperating with said nut rotating member for engaging or disengaging the thread on said shaft with the threads on said nut in accordance with the direction of rotation of said shaft.

* * * * *